Figure 1:
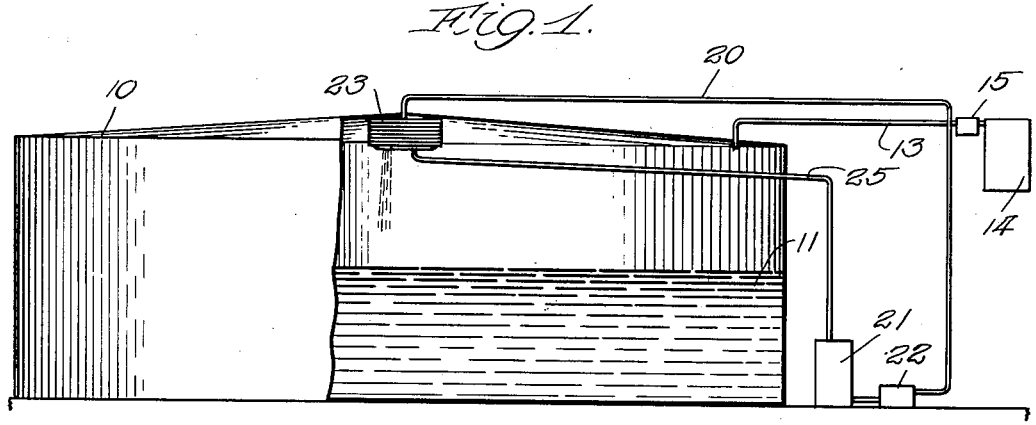

Sept. 23, 1952  I. L. WISSMILLER  2,611,511

METHOD OF PREVENTING EVAPORATION LOSS AND APPARATUS THEREFOR

Filed Nov. 12, 1949

Inventor.
Ivan L. Wissmiller,
By Schroeder, Merriam,
Hofgren & Brady, Attys.

Patented Sept. 23, 1952

2,611,511

UNITED STATES PATENT OFFICE 2,611,511

METHOD OF PREVENTING EVAPORATION LOSS AND APPARATUS THEREFOR

Ivan L. Wissmiller, Chicago, Ill., assignor to Chicago Bridge & Iron Company, a corporation of Illinois Application November 12, 1949, Serial No. 126,775

7 Claims. (Cl. 220—85)

1

This invention relates to a method of preventing evaporation loss from a storage vessel containing volatile liquid and an apparatus suitable therefor.

It is well known that when volatile liquids, such as gasoline, are stored in a vessel, space other than that occupied by the liquid will contain vapor of the liquid. The vapor pressure of gasoline is usually less than atmospheric, and it is not customary to make the walls of such vessels capable of withstanding an external pressure equal to the difference between vapor pressure and atmospheric. For that reason air is admitted to provide a mixture of air and vapor so that the total pressure is substantially equal to atmospheric.

It is costly to design the vessel to withstand the greatest internal pressure that can develop in the air-vapor mixture. It is therefore customary to provide a pressure vent to limit the internal pressure to an amount slightly above atmospheric.

If the vessel has constant volume, vapor losses result when air and vapor are expelled as a result of admitting liquid gasoline or increasing temperature. Conversely air is drawn into the vapor space as a result of withdrawing gasoline or decreasing temperature.

Well known physical laws and concepts may be applied separately to the vapor and to the air in the air-vapor mixture. The vapor tends to remain in equilibrium with its liquid surface. When the volume or temperature changes, evaporation or condensation occurs, or tends to occur, as required to maintain the partial pressure of the vapor equal to the vapor pressure of the liquid at the surface. Therefore volume or temperature change of the vapor itself does not cause loss of vapor from the vessel provided the vapor pressure is less than atmospheric.

On the other hand, air in the air-vapor mixture cannot be taken up and released by anything inside the ordinary vessel. When the vessel is filled with liquid, the available volume for the air is decreased and air is expelled from the vessel. When the temperature of the air-vapor mixture increases, the air must expand and is expelled. When the liquid surface temperature increases, there is a corresponding increase in vapor pressure. Since the total pressure must remain atmospheric, the partial pressure of the air must decrease a like amount. The volume of air must increase to accommodate the pressure decrease and air is expelled. It is seen that each of these three things will drive air from the tank.

2

Since the air and the vapor are intimately mixed together, vapor is carried out with the air and lost from the vessel.

It is apparent from the above that air is the cause of such evaporation losses. If the air in the vessel can be separated from the vapor and removed from the vessel, losses of vapor can be eliminated.

Any non-condensible gas not soluble in gasoline can be used in place of the air. For example, carbon dioxide can serve the same purpose in the air-vapor mixture. The loss of vapor would be the same when filling or temperature increase drives the non-condensible gas from the vessel.

By non-condensible gas as used herein is meant a gas which is non-condensible at ordinary storage temperatures (generally atmospheric) of volatile hydrocarbons.

In accordance with this invention the air is replaced by a non-condensible gas which is soluble in a selective solvent. Both the gas and its solvent should have no substantial solubility in gasoline. A suitable combination is carbon dioxide gas and a selective solvent such as ethanolamine, preferably the monoethanolamine. Other gases may be used in combination with suitable solvents. The solvent may be a liquid or a solid and the gas may be held by absorption, adsorption, in solution or any other form of mutual attraction.

Figure 2:
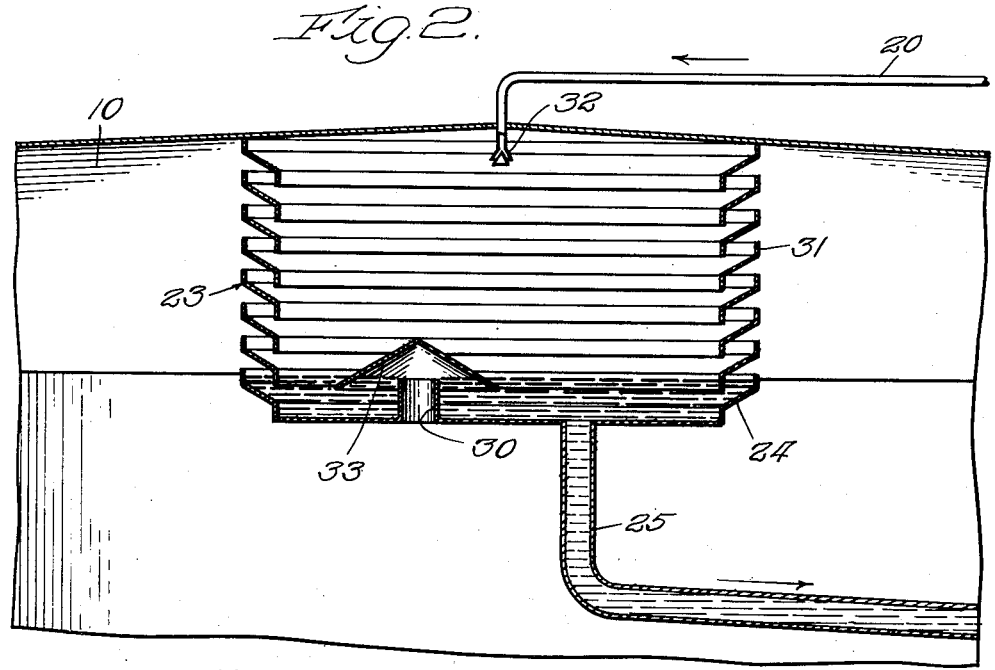
Figure 3:
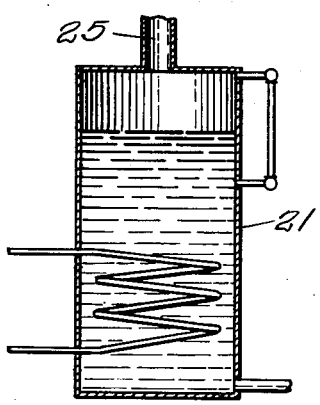

The invention is illustrated diagrammatically in the drawings. Fig. 1 is an elevation, partly in section, which illustrates an apparatus partly in section, suitable for application of the problem. Fig. 2 represents an enlarged view of the spray apparatus located inside the vessel. Fig. 3 is an elevation and section of a storage tank for the selective solvent.

As shown in the drawings, 10 represents a suitable storage container having fixed walls and provided with means (not shown) for introducing and removing gasoline. The container is filled to the desired level with gasoline indicated by 11. The vapor space above it is filled with carbon dioxide, which replaces the air. The carbon dioxide is provided from a carbon dioxide storage vessel 14 through a valve 15 which opens when a slight partial vacuum exists in the container 10.

An absorption system is provided within the upper portion of the tank. This comprises a spray 23 of selective solvent supplied from the container 21 by the centrifugal pump 22 through the pipe 20. To operate the spray, the pump starts automatically whenever the pressure in the vessel 10 exceeds atmospheric. The sprayed solvent collects in the sump 24 and is returned through the pipe 25 to the container 21.

The de-gasing chamber above the sump 24 is a cylindrical chamber provided with louvered sides 31. The solvent sprays from the nozzle 32, the direction of the slope of the louvers being such as to prevent the sprayed liquid from entering the main storage vessel. A hood 33 prevents solvent from entering the gasoline overflow line 30.

The sprayed solvent, by dissolving gas, lowers the gas pressure and causes gasoline to condense and collect in the sump. Ultimately it overflows into the overflow line 30 and returns to the main storage vessel. The selective solvent, being heavier and not soluble or miscible in gasoline, flows back to the container 21.

It is advisable to provide an emergency pressure relief vent on container 10 to protect it in the event the capacity of the solvent is not sufficient to prevent excessive pressure rise.

The pump 22 stops automatically when the pressure in the main storage vessel does not tend to exceed atmospheric.

When the pressure in the main storage vessel is slightly less than atmospheric heat is automatically supplied to the solvent container 21. This reduces the ability of the solvent to hold the carbon dioxide and carbon dioxide is released to bubble up through the pipe 25 or through the pump 22 and the pipe 20 into the main storage vessel. Ordinarily the released carbon dioxide will bubble up through the pipe 25 and through the gasoline which stands in the top of the sump and the carbon dioxide will pick up gasoline vapor, thereby increasing its volume before entering the main storage vessel. Whenever the return of carbon dioxide is insufficient to prevent an excessive vacuum in the main storage vessel 10 additional carbon dioxide is furnished automatically from the vessel 14.

It is obvious that instead of having the de-gasing chamber within the main storage container, the carbon dioxide-vapor mixture may be conducted to a de-gasing chamber outside wherein the carbon dioxide and the gasoline vapor are separated and the gasoline vapor condensed for return to the storage vessel.

Air and other non-condensible gases which are not soluble may be released from the gasoline, or otherwise accumulated in the system, from time to time. Whenever the quantity of these non-condensible vapors is such as to produce a pressure in excess of atmospheric when combined with the partial pressure of the gasoline, they must be vented. This is preferably done at a time when it is cool so that a minimum loss of gasoline vapor will result. Preferably it is done from the top of the spray chamber and during or immediately following spraying so that the carbon dioxide content of the vented gases is at a minimum.

The foregoing detailed description is given for clearness of understanding only, and no unnecessary limitations should be understood therefrom as modifications will be obvious to those skilled in the art.

I claim:

1. In the storage of volatile hydrocarbon liquids in a vessel having a fixed capacity greater than the volume of the liquid, the steps of supplying a soluble, non-condensible gas to the vapor space within said container when the pressure therein is less than atmospheric and selectively dissolving said gas in a selective liquid solvent when the pressure is greater than atmospheric.

2. The method as set forth in claim 1 in which the liquid released upon solution of the gas is collected and returned to the liquid storage area.

3. The method as set forth in claim 1 in which the liquid is gasoline and the gas is carbon dioxide.

4. The method as set forth in claim 1 in which the liquid is gasoline, the selective solvent is a liquid heavier than gasoline, and gasoline is led to the liquid storage area by gravity separation.

5. In a volatile hydrocarbon storage vessel, a closed container having a liquid storage area and a vapor storage area communicating therewith, means for introducing a readily soluble, non-condensible gas into the vapor storage area, means for intimately contacting gas from the vapor storage area with a selective liquid solvent having no substantial solubility for the liquid hydrocarbon whereby upon solution of the gas hydrocarbon vapors condense as a liquid; and means for separating the liquefied hydrocarbon from the solvent and for returning it to the liquid storage area.

6. A vessel as set forth in claim 5 in which the means for intimately contacting the gas and selective solvent are in an upper portion of the vessel.

7. A vessel as set forth in claim 5 in which the means for intimately contacting the gas and selective solvent are in an upper portion of the vessel, and the condensed liquid is separated and returned to the liquid storage area by gravity flotation on the solvent.

IVAN L. WISSMILLER.

REFERENCES CITED

The following references are of record in the file of this patent:

UNITED STATES PATENTS

| Number | Name | Date |
|---|---|---|
| 1,147,729 | Hurlbrink | July 27, 1915 |
| 2,157,579 | Urquhart | May 9, 1939 |